July 10, 1956

G. V. FRUSHOUR 2,754,139

UNIVERSALLY ADJUSTABLE PIPE COUPLING WITH EXTERIOR LOCKING MEANS

Filed Oct. 30, 1952

Inventor
George V. Frushour
by Kenneth Luckett
Attorney

July 10, 1956

G. V. FRUSHOUR 2,754,139

UNIVERSALLY ADJUSTABLE PIPE COUPLING
WITH EXTERIOR LOCKING MEANS

Filed Oct. 30, 1952

Inventor
George V. Frushour
by Kenneth␣Chadwick
Attorney

July 10, 1956

G. V. FRUSHOUR 2,754,139

UNIVERSALLY ADJUSTABLE PIPE COUPLING
WITH EXTERIOR LOCKING MEANS

Filed Oct. 30, 1952

Inventor
George V. Frushour
by Kenneth... 
Attorney

United States Patent Office 2,754,139
Patented July 10, 1956

2,754,139

UNIVERSALLY ADJUSTABLE PIPE COUPLING WITH EXTERIOR LOCKING MEANS

George V. Frushour, La Porte, Ind., assignor to Allis-Chalmers Manufacturing Company, Milwaukee, Wis.

Application October 30, 1952, Serial No. 317,794

5 Claims. (Cl. 285—184)

This invention relates to pipe couplings and more particularly to a universally adjustable pipe coupling for use in connection with a material blower or the like.

In the use of material blowers for filling silos on the farm it is usually impractical or impossible to position the blower sufficiently close to the silo so that the pipe line leading to the top of the silo can be erected in a true vertical direction. Often the base of the silo is enlarged for purposes of strength, and the power pulley is located on the blower in such a position that the pipe line must be somewhat inclined in order to provide adequate clearance between silo and pulley and proper overhang of the discharge boot of the silo filler with respect to the base of the silo.

Generally, it is an object of this invention to provide an improved universally adjustable pipe coupling which will take care of the hereinabove outlined requirements for a silo filling pipe line in a practical and entirely satisfactory manner.

Another object of this invention is to provide a pipe coupling of the hereinabove outlined character which affords a desirable degree of flexibiilty without causing interference with the flow of material through the coupling.

Another object of this invention is to provide a universally adjustable pipe coupling which lends itself for use in a pipe system for blowing hay or grain horizontally into a barn or bin, and which can readily and effectively be locked in any angularly adjusted position.

It is a further object of this invention to provide a swivel joint assembly in a pipe system which is substantially as strong as the conventional pipe and coupling elements in the pipe system.

It is a further object of this invention to provide a universally adjustable pipe coupling which is readily assembled, disassembled and adjusted.

Accordingly, the present invention may be considered as comprising the various features of construction and combination of elements as is more fully set forth in the following detailed description and appended claims, reference being had to the accompanying drawings, wherein:

Figure 2:
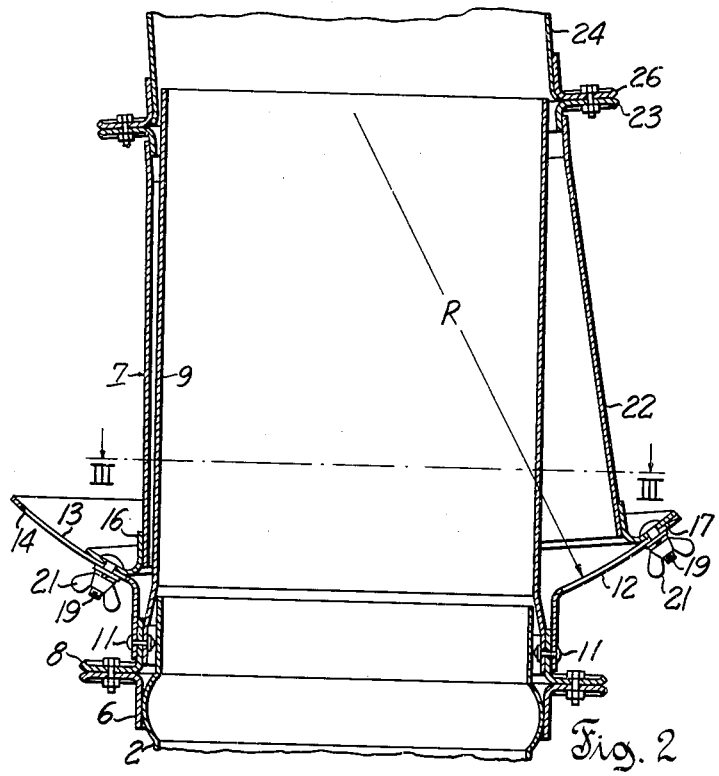
Fig. 2 is an enlarged section view of a universally adjustable pipe coupling shown in Fig. 1.
Figure 1:
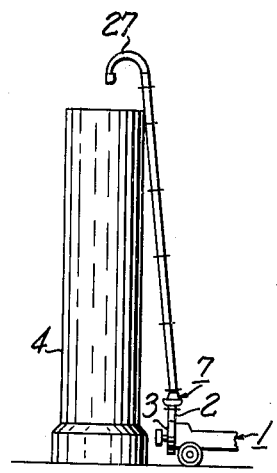
Fig. 1 is a side elevation view of a silo and silo filling equipment, illustrating an embodiment of the invention.

Referring to the drawings, it is seen that a silo filler 1 having a discharge boot 2 attached to a fan housing 3 is positioned adjacent a silo 4 in condition for blowing material into the open top of the silo. Attached to an upper portion of boot 2 is a coupling band 6 (see Figs. 2 and 4). Telescopically received over the upper end of boot 2 is a coupling assembly 7 including at its lower end a coupling band 8 joined to coupling band 6 by detachable conventional means such as nuts and bolts. An inner pipe member 9 is attached at its lower end to coupling band 8 by conventional means such as rivets 11. A swivel joint socket 12 is provided with a skirt portion having an upper concavely spherical bearing surface 13 and is also attached to coupling band 8 by rivets 11. Spherical surface 13 is formed with a radius R substantially equal to the effective length of inner pipe member 9 (see Fig. 2). Socket 12 is provided with four radially extending slots 14 positioned 90° apart (see Figs. 3 and 5).

A swivel joint ring 16 is provided with a skirt portion having a lower convexly spherical surface bearing portion 17 complementary to spherical surface 13 and is positioned with the aforesaid spherical bearing surfaces in contact with each other and for relative movement to each other. Ring 16 is provided with four arcuate, circumferential slots 18 positioned at 90° center spacings and adjacent to the periphery of ring 16 (see Figs. 3 and 5). Ring 16 is adjustably joined to socket 12 by means of bolts 19 which extend through overlapping pairs of radial slots 14 and circumferential slots 18 and by means of nuts such as wing nuts 21. Attached to an inner peripheral surface of ring 16 is a frusto-conically shaped outer pipe member 22 which has attached to its smaller end a conventional coupling band 23. A discharge pipe section 24 has a coupling band 26 attached at its lower end. Coupling bands 23 and 26 are detachably joined by conventional means such as nuts and bolts.

Figure 3:
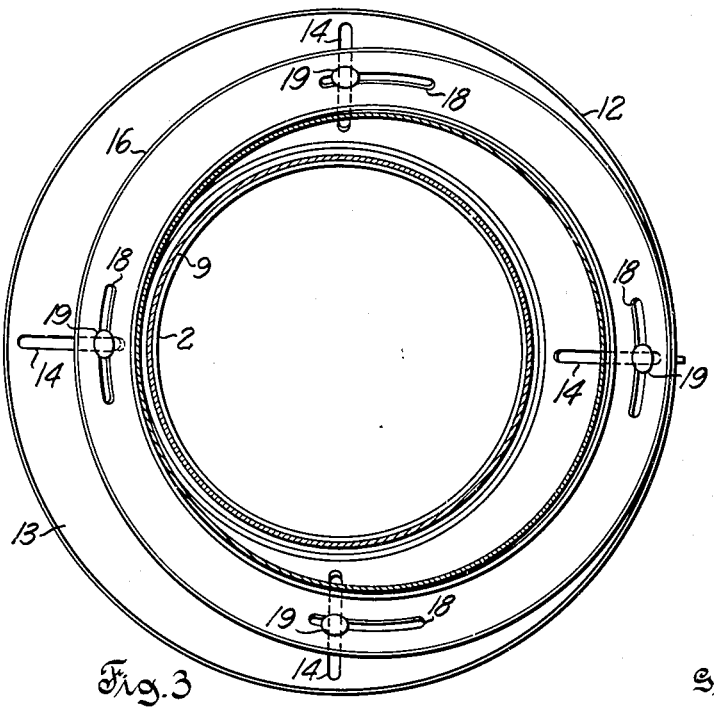
Fig. 3 is a view taken on line III—III of Fig. 2.
Figure 4:
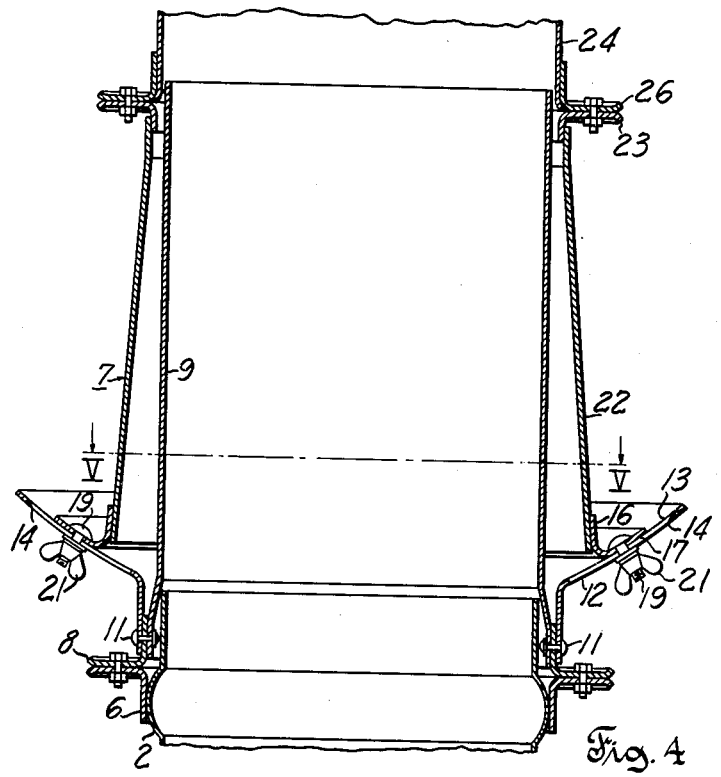
Fig. 4 is a view similar to Fig. 2 with the component parts of the pipe coupling shown in a different position of adjustment.
Figure 5:
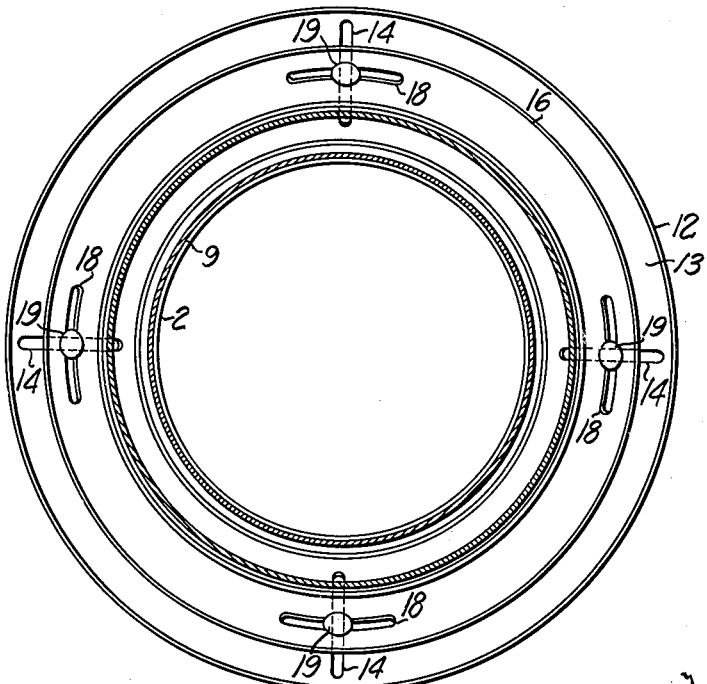
Fig. 5 is a view taken on line V—V of Fig. 4.

Figure 4 shows coupling 7 adjusted so that discharge pipe section 24 extends vertically. Fig. 2 shows coupling 7 adjusted so that the discharge pipe sections connected to the upper end thereof will have an angular displacement of approximately 5° from the vertical. It is to be noted that the adjustment of ring 16 relative to socket 12 does not change the position of inner pipe member 9 and the adjustment of the swivel ring does not change the material discharge area of pipes 2, 9 or 24 but merely slightly changes the direction of material movement at the juncture where the upper end of inner pipe member 9 is in proximate relation with discharge pipe section 24. Furthermore, no obstructions in the form of pockets or projections are present to prevent the easy flow of material through the pipes.

To adjust coupling 7 from the position shown in Fig. 4 to the position shown in Fig. 2 to provide a desired angularity (a convenience in filling a silo) wing nuts 21 are loosened and outer pipe member 22 and swivel joint ring 16 are moved orbitally relative to socket 12 until the desired angle of adjustment is secured, at which time the wing nuts 21 are tightened preventing any further relative movement of ring 16 to socket 12.

It is to be noted that in any position of adjustment the area of contact or bearing area between ring 16 and socket 12 remains constant thereby providing a uniformly strong support for the pipe sections extending above coupling 7 and which area is substantially equal to the contact area provided by the conventional coupling bands 23 and 26, whereas in some of the prior art constructions the bearing area in a swivel coupling is greater on one side of the swivel coupling than on the other.

An embodiment of applicant's invention is easy to manufacture and easy to assemble and disassemble. For example, a standard coupling band such as 8 is taken and an inner pipe member 9 is riveted to the inside of the band while socket 12 is attached to the outside of the band with these same rivets. A ring 16 is riveted or otherwise fixedly attached to the outside base portion of a frusto-conically shaped outer pipe member 22 having a standard coupling band 23 attached to the inner aspect of the small end thereof. This outer pipe member assembly can readily be slid over the top of the inner pipe member until the bearing surfaces of ring 16 and socket 12 are in contact at which time bolts 19 can be inserted through slots 14 and 18 and wing nuts 21 tightened up on bolts 19 until relative movement of ring 16 and socket 12 is prevented.

Figure 6:
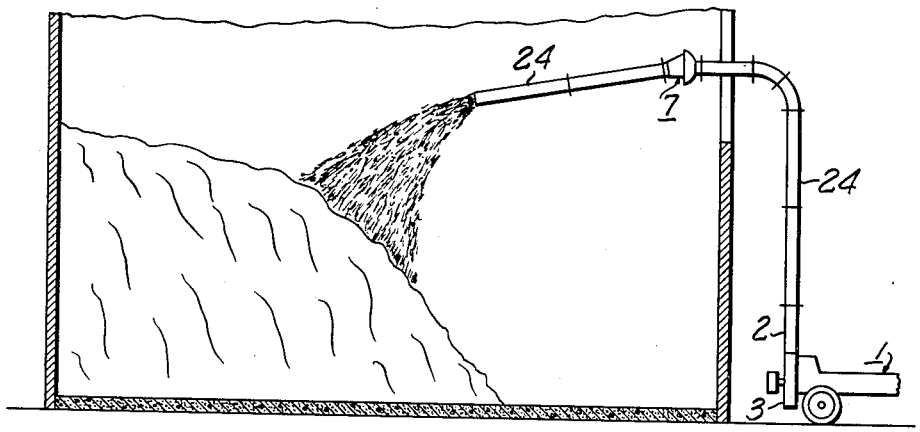
Fig. 6 is a side elevation view of a material blower and appropriate piping for discharging material horizontally, as through an opening in a barn.

As the upper and lower ends of coupling 7 are provided with conventional coupling bands 8 and 23, respectively, it is seen that the use of assembly 7 is not restricted to that part of a pipe system directly adjacent fan casing discharge boot 2 but can be used at any point between pipe sections (see Fig. 6) where a slight angularity is desired as when horizontally filling a barn or bin. Under such conditions the adjustment of angularity is accomplished in the same manner as previously described, that is wing nuts 21 are loosened and ring 16 is moved relative to socket 12 until the desired degree of angularity is obtained. Wing nuts 21 are then tightened to prevent further relative movement of ring 16 to socket 12.

Figure 7:
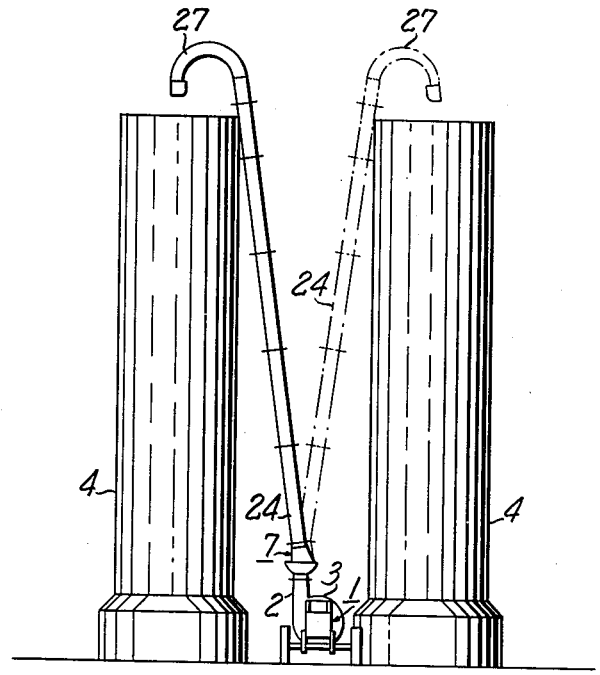
Fig. 7 is a side elevation view of a silo filler and appropriate piping embodying the invention, and demonstrating a change-over of the piping from one position to another for filling two silos standing next to each other.

Fig. 7 shows a special situation where two silos are positioned close together. In this situation the blower can be located in one position and both silos filled by swinging the pipes from one silo to the other without moving the blower. After one silo is filled, this can be accomplished by removing wing nuts 21 and bolts 19 and moving ring 16 and the pipes attached thereto relative to socket 12 until discharge pipe 27 is properly positioned over the second silo. Bolts 19 are then reinserted through the slots in ring 16 and socket 12, wing nuts 21 are then tightened up on bolts 19 until relative movement between ring 16 and socket 12 is prevented.

In general terms, the herein disclosed universally adjustable joint assembly comprises a coupling band, as represented by the coupling band 8, which is removably attached to a first pipe section as represented by the boot 2. The inner pipe member 9 is attached at one end to the coupling band 8 and forms an extension of the first pipe section 2. The socket member 12 which is attached to the coupling band 8 presents a spherically concave bearing surface 13 on an annular skirt portion thereof surrounding the inner pipe member 9, and a ring member, as represented by the ring 16, has an inner periphery in surrounding relation to and of substantially larger diameter than the inner pipe member 9 and presents a spherically convex bearing surface on an annular skirt portion thereof in contact with and complementary to the spherically concave bearing surface 13. An outer pipe member as represented by the frusto-conically shaped pipe 22, is mounted about the inner pipe member 9, and the outer pipe member 22 is attached at one end thereof to the ring member 16 inwardly of the second mentioned skirt portion which presents the spherically convex bearing surface. The other end of the outer pipe member has another coupling band, such as the coupling band 23, attached to a second pipe section, such as the pipe section 24, and the inner periphery of said other coupling band and the other end of said inner pipe member are of substantially the same size and located substantially in a plane including the center of the spherically concave and of the spherically convex bearing surfaces. Adjustable locking means, which in the illustrated embodiment of the invention include the slots 14, 18, bolts 19 and wing nuts 21, are operatively associated with the skirt portion of the socket member 12 and with the skirt portion of the ring member 16 exteriorly of the outer pipe member 22 for locking the ring member 16 in orbitally and rotatively adjusted relation to the socket member 12.

It is to be understood that it is not desired to limit the invention to the particular features and details described herein for the purposes of illustration and that the invention is to be considered as including such other forms and modifications as are fairly embraced within the scope of the appended claims.

It is claimed and desired to secure by Letters Patent:

1. A universally adjustable joint assembly comprising a coupling band removably attached to a first pipe section, an inner pipe member attached at one end to said coupling band and forming an extension of said first pipe section, a socket member attached to said coupling band and presenting a spherically concave bearing surface on an annular skirt portion thereof surrounding said inner pipe member, said skirt portion presenting a plurality of radial slots circumferentially spaced from each other, a ring member positioned about said inner pipe member and presenting a spherically convex bearing surface on an annular skirt portion thereof in contact with said spherically concave bearing surface and being complementary thereto, said skirt portion of said ring presenting peripherally extending arcuate slots in overlapping relation, respectively, to said radially extending slots, an outer pipe member mounted about said inner pipe member and being attached at one end thereof to said ring member, said outer pipe member having a coupling band attached to the other end thereof for attachment with a coupling band on a second pipe section, said inner pipe member having its other end positioned in proximate relation to the coupling band on said second pipe section, and adjustable locking means passing through overlapping pairs of radially and peripherally extending slots for locking said ring member in orbitally and rotatively adjusted relation to said socket member.

2. A universally adjustable joint assembly comprising a coupling band attached to the upper end of a first pipe section, an inner pipe member attached at its lower end to said coupling band, a socket member attached to said coupling band and presenting an upper spherically concave bearing surface on an annular skirt portion thereof surrounding said inner pipe member, said upper surface being formed with a radius substantially equal to the effective length of said inner pipe member and presenting a plurality of circumferentially spaced radial slots in the skirt portion thereof, a ring member positioned about said inner pipe member and presenting a lower spherically convex bearing surface on an annular skirt portion thereof in contact with said concave surface and being complementary thereto, said ring member skirt portion being provided with peripherally extending arcuate slots in overlapping relation, respectively, to said radially extending slots, an outer frusto-conically shaped pipe member attached at its larger end to said ring member, said outer pipe member having a coupling band about its smaller end attached to a second pipe section, said inner pipe member having its upper end in proximate relation to the coupling band on the smaller end of said outer pipe member, and adjustable locking means passing through overlapping pairs of radially and peripherally extending slots for locking said ring member in orbitally adjusted relation to said socket member.

3. A universally adjustable joint assembly comprising a first coupling band detachably connected to a second coupling band attached to the upper end of a first pipe section, an inner pipe member attached at one end to said first coupling band, a socket attached to said first coupling band and presenting a spherically concave bearing surface on an annular skirt portion thereof surrounding said inner pipe member, said spherical surface being formed with a radius substantially equal to the effective length of said inner pipe member, said skirt portion presenting a plurality of circumferentially spaced radial slots, a ring member positioned about said inner pipe member and presenting a spherically convex bearing surface on an annular skirt portion thereof in contact with said concave surface and being complementary thereto, said ring member skirt portion being provided with peripherally extending arcuate slots in overlapping relation, respectively, to said radially extending slots, said contacting bearing surfaces being substantially of the same area as the areas of contact between said coupling bands, said contacting surfaces being uniform in size about said ring and said socket, an outer frusto-conically shaped pipe member mounted about said inner pipe member and being attached at one end thereof to said ring member, said outer pipe member having a third coupling band on its other end attached to a fourth coupling band on a second pipe section, said inner pipe member having its other end positioned in proximate relation to said fourth coupling band on said second pipe section, and adjustable locking means passing through overlapping pairs of radially and peripherally extending slots for locking said ring member in orbitally adjusted relation to said socket.

4. A universally adjustable joint assembly comprising a coupling band attached to a first pipe section, an inner pipe member attached at one end to said coupling band and forming an extension of said first pipe section, a socket member attached to said coupling band and presenting a spherically concave bearing surface on an annular skirt portion thereof surrounding said inner pipe member, a ring member having an inner periphery in surrounding relation to and of substantially larger diameter than said inner pipe member and presenting a spherically convex bearing surface on an annular skirt portion thereof in contact with said spherically concave bearing surface and being complementary thereto, an outer pipe member mounted about said inner pipe member and being attached at one end thereof to said ring member inwardly of said second mentioned skirt portion, the other end of said outer pipe member having another coupling band attached to a second pipe section, and the inner periphery of said other coupling band and the other end of said inner pipe member being of substantially the same size and located substantially in a plane including the center of said spherical surfaces, and adjustable locking means operatively associated with said skirt portion of said socket member and with said skirt portion of said ring member exteriorly of said outer pipe member for locking said ring member in orbitally and rotatively adjusted relation to said socket member.

5. A universally adjustable joint assembly comprising a coupling band attached to a first pipe section, an inner pipe member attached at one end to said coupling band and forming an extension of said first pipe section, a socket member attached to said coupling band and presenting a spherically concave bearing surface on an annular skirt portion thereof surrounding said inner pipe member, a ring member having an inner periphery in surrounding relation to and of substantially larger diameter than said inner pipe member and presenting a spherically convex bearing surface on an annular skirt portion thereof in contact with said spherically concave bearing surface and being complementary thereto, an outer frusto-conically shaped pipe member mounted about said inner pipe member and being attached at its large end to said ring member inwardly of said second mentioned skirt portion, said outer pipe member having another coupling band about its small end attached to a second pipe section, and the inner periphery of said other coupling band and the other end of said inner pipe member being of substantially the same size and located substantially in a plane including the center of said spherical surfaces, and adjustable locking means operatively associated with said skirt portion of said socket member and with said skirt portion of said ring member exteriorly of said outer pipe member for locking said ring member in orbitally and rotatively adjusted relation to said socket member.

References Cited in the file of this patent

UNITED STATES PATENTS

| | | |
|---|---|---|
| 1,202,687 | Elkerton | Oct. 24, 1916 |
| 1,703,670 | Hoeft | Feb. 26, 1929 |
| 2,300,247 | Dion | Oct. 27, 1942 |

FOREIGN PATENTS

| | | |
|---|---|---|
| 925,288 | France | Mar. 24, 1947 |